United States Patent
Furui et al.

(10) Patent No.: US 11,862,055 B2
(45) Date of Patent: Jan. 2, 2024

(54) POSITION DETECTION METHOD, DISPLAY DEVICE, AND POSITION DETECTION SYSTEM

(71) Applicant: SEIKO EPSON CORPORATION, Tokyo (JP)

(72) Inventors: Shiki Furui, Matsumoto (JP); Fumiya Horikawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 146 days.

(21) Appl. No.: 17/587,873

(22) Filed: Jan. 28, 2022

(65) Prior Publication Data
US 2022/0246071 A1     Aug. 4, 2022

(30) Foreign Application Priority Data
Jan. 29, 2021   (JP) ................. 2021-013060

(51) Int. Cl.
*G09G 5/00*     (2006.01)
*G09G 5/02*     (2006.01)
(Continued)

(52) U.S. Cl.
CPC ............ *G09G 3/002* (2013.01); *G06T 7/90* (2017.01); *G09G 2320/0693* (2013.01)

(58) Field of Classification Search
CPC ........... G09G 3/002; G09G 2320/0693; G09G 2320/06; G09G 2320/066; G06T 7/90; G06T 7/0044; G06T 7/136; G06T 7/74; G06T 2207/10016; G06T 2207/20148; G06T 2207/30204; G06T 11/001; H04N 1/46; H04N 1/58; H04N 1/60;
(Continued)

(56) References Cited

U.S. PATENT DOCUMENTS

2002/0018138 A1* 2/2002 Yoshiro .............. H04N 1/00326
                                                                 348/333.12
2012/0257787 A1* 10/2012 Ogasawara ............. G06T 7/136
                                                                 382/103
(Continued)

FOREIGN PATENT DOCUMENTS

JP      2018-148261 A    9/2018
WO   WO-2021111733 A1 *  6/2021  ........... H04N 9/3185

*Primary Examiner* — Wesner Sajous
(74) *Attorney, Agent, or Firm* — Oliff PLC

(57) ABSTRACT

A position detection method includes projecting a first pattern image on a display surface, the first pattern image including a first region having a first color corresponding to a first portion of a first identification information indicating the first region and a second region having a second color corresponding to a first portion of a second identification information, obtaining a first captured image by capturing the display surface, projecting a second pattern image onto the display surface including the first region having a third color which corresponds to a second portion of the first identification information and the second region having a fourth color corresponding to a second portion of the second identification information, obtaining a second captured image by capturing the display surface, associating a first position in an image projected with a second position in a third captured image obtained by capturing the display surface.

6 Claims, 7 Drawing Sheets

(51) Int. Cl.
  *G09G 5/06* (2006.01)
  *G09G 3/00* (2006.01)
  *G06T 11/00* (2006.01)
  *G06T 7/90* (2017.01)
  *H04N 1/60* (2006.01)
  *H04N 5/202* (2023.01)
  *H04N 5/57* (2006.01)
  *H04N 9/64* (2023.01)
  *H04N 9/67* (2023.01)

(58) Field of Classification Search
  CPC ............ H04N 5/202; H04N 5/57; H04N 9/64; H04N 9/67; H04N 9/73; H04N 9/3185; H04N 9/3191; H04N 9/3194; H04N 9/3197; G03B 21/00; A63F 13/92; A63F 13/95; A63F 13/26; A63F 13/213; A63F 13/655; A63F 2300/204; A63F 2300/1093
  USPC ........................................................ 382/162
  See application file for complete search history.

(56) References Cited

U.S. PATENT DOCUMENTS

2012/0257788 A1* 10/2012 Ogasawara ............. G06T 7/136
   382/103
2018/0255266 A1   9/2018 Tamura
2021/0136338 A1*  5/2021 Kashiwagi ........... H04N 9/3191

* cited by examiner

| FIRST SERIAL NUMBER | SECOND SERIAL NUMBER | IDENTIFI-CATION NUMBER | Y-COORDI-NATE | X-COORDI-NATE | SPATIAL CODE | COLOR CODE ||||| 
|---|---|---|---|---|---|---|---|---|---|---|
| | | | | | | FIRST COLOR CODE | SECOND COLOR CODE | THIRD COLOR CODE | FOURTH COLOR CODE | FIFTH COLOR CODE |
| 01 | 000 | 01000 | 120 | 96 | 001_010_001_001_001 | 001 | 010 | 001 | 001 | 001 |
| 01 | 001 | 01001 | 120 | 192 | 001_010_001_001_010 | 001 | 010 | 001 | 001 | 010 |
| 01 | 002 | 01002 | 120 | 288 | 001_010_001_001_011 | 001 | 010 | 001 | 001 | 011 |
| 01 | 003 | 01003 | 120 | 384 | 001_010_001_001_100 | 001 | 010 | 001 | 001 | 100 |
| 01 | 004 | 01004 | 120 | 480 | 001_010_001_001_101 | 001 | 010 | 001 | 001 | 101 |
| 01 | 005 | 01005 | 120 | 576 | 001_010_001_001_110 | 001 | 010 | 001 | 001 | 110 |
| 01 | 006 | 01006 | 120 | 672 | 001_010_001_001_111 | 001 | 010 | 001 | 001 | 111 |
| 01 | 007 | 01010 | 120 | 768 | 001_010_001_010_001 | 001 | 010 | 001 | 010 | 001 |
| ... | ... | ... | ... | ... | ... | ... | ... | ... | ... | ... |
| 01 | 169 | 01331 | 1080 | 1728 | 001_010_100_100_010 | 001 | 010 | 100 | 100 | 010 |
| 01 | 170 | 01332 | 1080 | 1824 | 001_010_100_100_011 | 001 | 010 | 100 | 100 | 011 |

# POSITION DETECTION METHOD, DISPLAY DEVICE, AND POSITION DETECTION SYSTEM

The present application is based on, and claims priority from JP Application Serial Number 2021-013060, filed Jan. 29, 2021, the disclosure of which is hereby incorporated by reference herein in its entirety.

BACKGROUND

1. Technical Field

The present disclosure relates to a position detection method, a display device, and a position detection system.

2. Related Art

In the past, there has been known a technology of aligning a position of an image displayed on a display surface and a position of a taken image obtained by taking the image with an imaging section with each other.

For example, a projector disclosed in JP-A-2018-148261 (Document 1) projects a second projection image having a dot pattern on a projection surface, and then detects the dot pattern from a second taken image obtained by taking the second projection image thus projected. Then, the projector generates calibration data making the projection image and the taken image correspond to each other based on positions of dots thus detected.

However, the projector disclosed in Document 1 cannot generate accurate calibration data unless all of the dots of the dot pattern can be detected. Therefore, there is a problem that it is unachievable to accurately project an image when projecting the image on a complicated projection surface such as a curved surface.

SUMMARY

An aspect for solving the problem described above is directed to a position detection method including the steps of displaying a first pattern image on a display surface, the first pattern image having a plurality of regions, a color associated with first partial information obtained by dividing identification information set to each of the regions being formed in corresponding one of the regions, obtaining a first taken image obtained by imaging the display surface on which the first pattern image is projected, displaying a second pattern image on the display surface, the second pattern image having the plurality of regions, a color associated with second partial information as information other than the first partial information of the identification information set to each of the regions being formed in corresponding one of the regions, obtaining a second taken image obtained by imaging the display surface on which the second pattern image is projected, determining colors of the plurality of regions imaged in the first taken image and colors of the plurality of regions imaged in the second taken image, obtaining the first partial information and the second partial information set to a corresponding region between the first taken image and the second taken image based on a determination result of colors of the plurality of regions, and then detecting the identification information set to each of the regions based on the first partial information and the second partial information obtained, and associating a position of an image displayed on the display surface and a position of a taken image obtained by imaging a range including the display surface with each other based on the identification information detected, wherein an arrangement sequence is defined in a plurality of pieces of the identification information set to the plurality of regions, and the plurality of pieces of the identification information is set to the plurality of regions in accordance with a predetermined sequence.

Another aspect for solving the problem described above is directed to a display device including a display section configured to display an image on a display surface, a control section configured to control the display section to control display on the display surface, and an imaging section configured to image at least a part of the display surface, wherein the control section makes the display section display a first pattern image on the display surface, the first pattern image having a plurality of regions, a color associated with first partial information obtained by dividing identification information set to each of the regions being formed in corresponding one of the regions, makes the imaging section image the display surface on which the first pattern image is projected to obtain a first taken image taken by the imaging section, makes the display section display a second pattern image on the display surface, the second pattern image having the plurality of regions, a color associated with second partial information as information other than the first partial information of the identification information set to each of the regions being formed in corresponding one of the regions, makes the imaging section image the display surface on which the second pattern image is projected to obtain a second taken image taken by the imaging section, determines colors of the plurality of regions imaged in the first taken image and colors of the plurality of regions imaged in the second taken image, obtains the first partial information and the second partial information set to a corresponding region between the first taken image and the second taken image based on a determination result of colors of the plurality of regions, and then detects the identification information set to each of the regions based on the first partial information and the second partial information obtained, and associates a position of an image displayed on the display surface and a position of a taken image obtained by imaging a range including the display surface with each other based on the identification information detected, and an arrangement sequence is defined in a plurality of pieces of the identification information set to the plurality of regions, and the plurality of pieces of the identification information is set to the plurality of regions in accordance with a predetermined sequence.

Another aspect for solving the problem described above is directed to a position detection system including a display device configured to display an image on a display surface, an imaging device configured to image at least a part of the display surface, and a control device configured to control the display device and the imaging device, wherein the control device makes the display device display a first pattern image on the display surface, the first pattern image having a plurality of regions, a color associated with first partial information obtained by dividing identification information set to each of the regions being formed in corresponding one of the regions, makes the imaging device image the display surface on which the first pattern image is projected to obtain a first taken image taken by the imaging device, makes the display device display a second pattern image on the display surface, the second pattern image having the plurality of regions, a color associated with second partial information as information other than the first partial information of the identification information set to each of the regions being formed in corresponding one of the regions, makes the imaging device image the display surface on which the second pattern image is projected to obtain a second taken image taken by the imaging device, determines colors of the plurality of regions imaged in the first taken image and colors of the plurality of regions imaged in the second taken image, obtains the first partial information and the second partial information set to a corresponding region between the first taken image and the second taken image based on a determination result of colors of the plurality of regions, and then detects the identification information set to each of the regions based on the first partial information and the second partial information obtained, and associates a position of an image displayed on the display surface and a position of a taken image obtained by imaging a range including the display surface with each other based on the identification information detected, and an arrangement sequence is defined in a plurality of pieces of the identification information set to the plurality of regions, and the plurality of pieces of the identification information is set to the plurality of regions in accordance with a predetermined sequence.

BRIEF DESCRIPTION OF THE DRAWINGS

FIG. 4 is a diagram showing an example of a pattern information table.

DESCRIPTION OF AN EXEMPLARY EMBODIMENT

Figure 1:
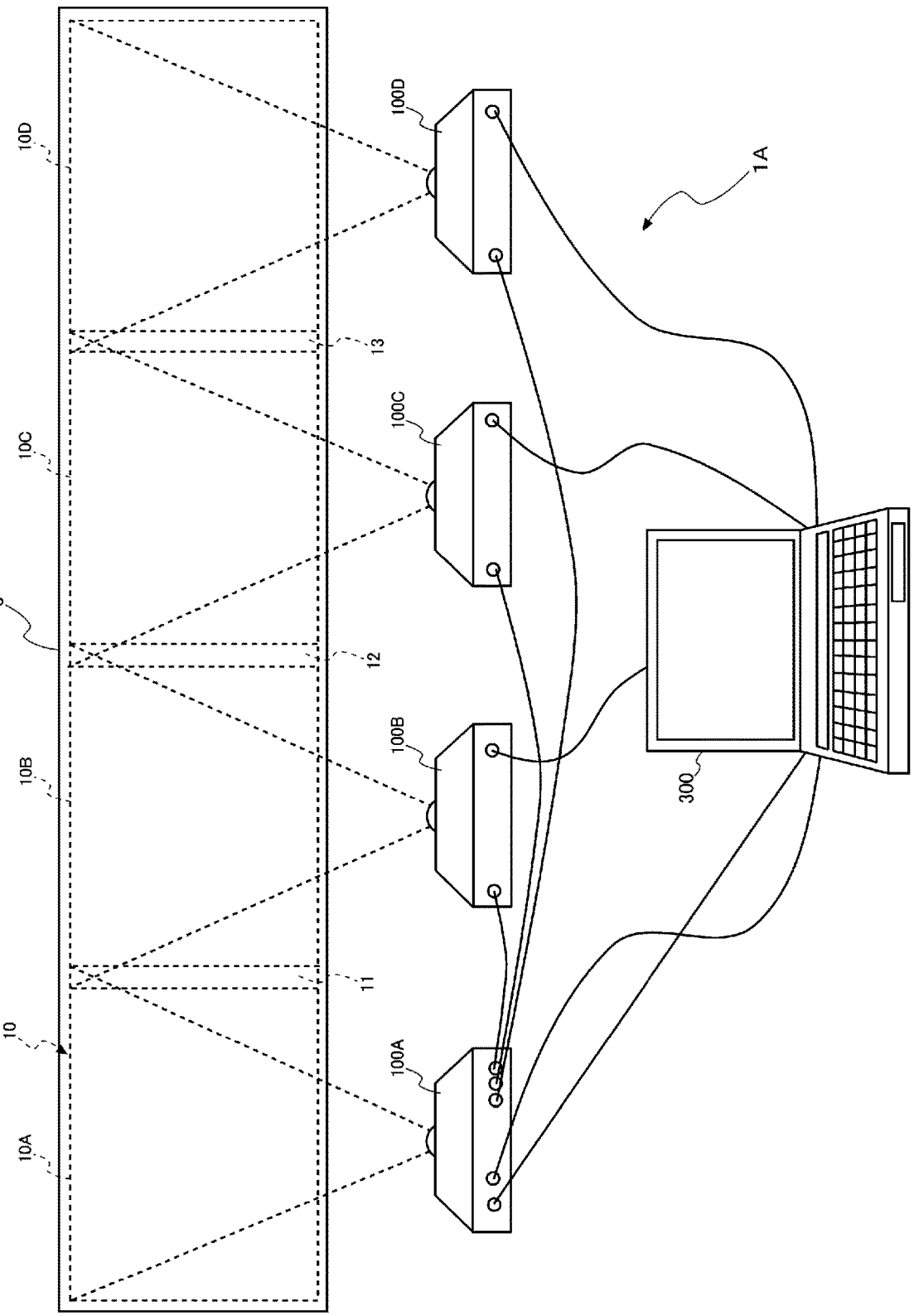
FIG. 1 is a diagram showing a configuration of a position detection system.

FIG. 1 is a diagram showing a configuration of a position detection system 1A.

The position detection system 1A is provided with a plurality of projectors 100 corresponding to a display device, and an image supply device 300.

The position detection system 1A according to the present embodiment is provided with four projectors 100A, 100B, 100C, and 100D, but the number of projectors 100 provided to the position detection system 1A is not limited to four. In the following description, the projectors 100A, 100B, 100C, and 100D are described as projectors 100 when there is no need to distinctly describe them.

The image supply device 300 and the projectors 100A, 100B, 100c, and 100D are coupled to each other with cables for image transmission. As the cables for the image transmission, there are used cables compatible with a standard such as USB (Universal Serial Bus), HDMI (High-Definition Multimedia Interface), or Display Port. HDMI is a registered trademark.

Further, the projector 100A and the projectors 100B, 100c, and 100D are coupled to each other with cables for data communication. As the cables for the data communication, there are used cables compatible with a standard such as Ethernet, IEEE 1394, or USB. Ethernet is a registered trademark. The projector 100A operates as a master machine, and the projectors 100B, 100C, and 100D each operate as a slave machine. In other words, the projector 100A controls operations of the projectors 100B, 100C, and 100D. In the present embodiment, when generating the calibration data, the projectors 100B, 100C, and 100D display predetermined images on the projection surface 5, or take the projection surface 5 on which the images are displayed in accordance with an instruction of the projector 100A. The projection surface 5 corresponds to a display surface. The calibration data is data in which a coordinate system set in the taken image taken by the imaging section 120 provided to each of the projectors 100 and a coordinate system set in a liquid crystal panel 163 of an image projection section 160 provided to corresponding one of the projectors 100 are made to correspond to each other. The coordinate system set in the taken image is hereinafter referred to as a taken image coordinate system, and the coordinate system set in the liquid crystal panel 163 is hereinafter referred to as a panel coordinate system.

The image supply device 300 supplies the projectors 100A, 100B, 100c, and 100D with image data via the cables for image transmission. Each of the projectors 100 generates image light based on the image data thus supplied, and then projects the image data thus generated on the projection surface 5. The image data to be supplied by the image supply device 300 can be data of a still image, or can also be image of a moving image.

As the image supply device 300, it is possible to use, for example, a notebook PC (Personal Computer), a desktop PC, a tablet terminal, a smartphone, and a PDA (Personal Digital Assistant).

In FIG. 1, there is illustrated when the projectors 100A, 100B, 100C, and 100D are flatly installed in a line in a lateral direction of the projection surface 5, and the projectors 100 display images in a lateral arrangement. An installation method of the projectors 100A, 100B, 100C, and 100D is not limited to the flat installation, but it is possible to adopt ceiling installation in which the projectors 100 are suspended from the ceiling, or wall installation in which the projectors 100 are hanged on the wall. Further, it is possible to install the projectors 100A, 100B, 100C, and 100D in a tandem arrangement, further, when coupling a larger number of printers 100 to each other, it is possible to arrange the projectors 100 in an N×M matrix (N and M are each an arbitrary natural number).

Areas of the projection surface 5 on which the projectors 100A, 100B, 100C, and 100D respectively project the image light are referred to as projection areas 10. The projector 100A projects the image light on the projection area 10A as a left end area of the projection surface 5. The projector 100B projects the image light on the projection area 10B as a right neighboring area of the projection area 10A. The projector 100C projects the image light on the projection area 10C as a right neighboring area of the projection area 10B. The projector 100D projects the image light on the projection area 10D as a right neighboring area of the projection area 10C.

The projectors 100A, 100B, 100C, and 100D perform tiling projection. The tiling projection is a projection method in which the plurality of projectors 100 is made to project the image light, and the images displayed by the plurality of projectors 100 are combined with each other on the projection surface 5 to thereby display a single large screen image.

In the tiling projection, the projectors 100 adjacent to each other project the image light so that the edges of the images to be displayed overlap each other. This is for making the boundaries of the images to be displayed inconspicuous. For example, the image to be displayed by the projector 100A and the image to be displayed by the projector 100B located at the right side thereof overlap each other in the edges thereof to form a superimposition area 11. Similarly, the image to be displayed by the projector 100B and the image to be displayed by the projector 100C located at the right side thereof overlap each other in the edges thereof to form a superimposition area 12. Similarly, the image to be displayed by the projector 100C and the image to be displayed by the projector 100D located at the right side thereof overlap each other in the edges thereof to form a superimposition area 13.

Figure 2:
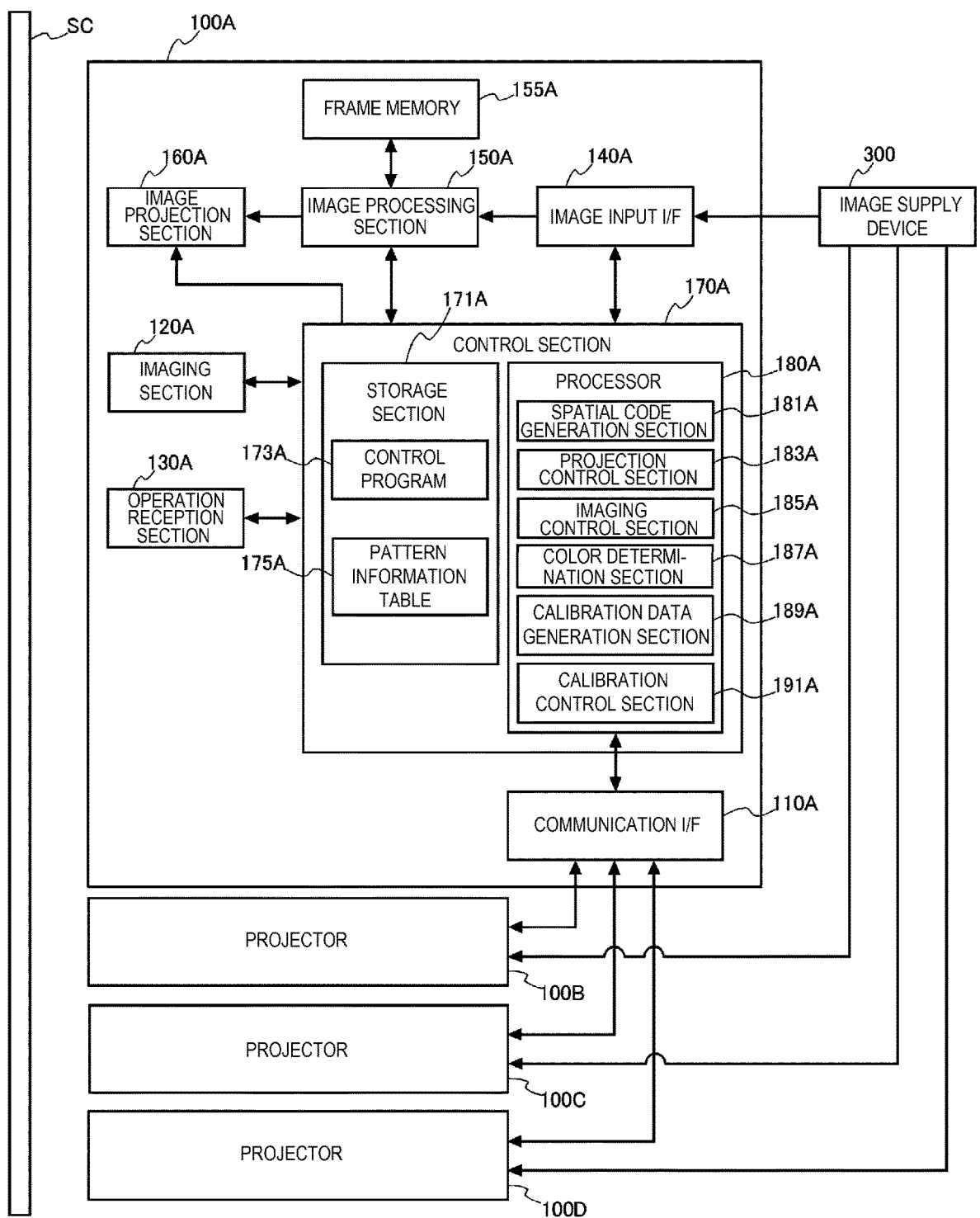
FIG. 2 is a diagram showing a configuration of a projector.

FIG. 2 is a diagram showing a configuration of the projector 100A.

The projectors 100A, 100B, 100C, and 100D are respectively provided with substantially the same configurations. Therefore, the configuration of the projector 100A will representatively be described, and the description of the configurations of other projectors 100B, 100C, and 100D will be omitted. Further, in the following description, in order to distinguish the configurations of the projectors 100 from each other, the constituents of the projector 100A are each attached with a symbol "A," and the constituents of the projector 100B are each attached with a symbol "B." Similarly, there is provided the description attaching a symbol "C" to the constituents of the projector 100C, and attaching a symbol "D" to the constituents of the projector 100D. For example, a control section of the projector 100A is described as a control section 170A, and a control section of the projector 100B is described as a control section 170B.

The projector 100A is provided with a communication I/F 110A, an imaging section 120A, an operation reception section 130A, an image input I/F 140A, an image processing section 150A, a frame memory 155A, an image projection section 160A, and the control section 170A.

The communication I/F 110A is an interface for data communication for performing data communication with the image supply device 300 and the projectors 100B, 100C, and 100D. To the communication I/F 110A, there are coupled the cables for the data communication which are respectively coupled to the image supply device 300 and the projectors 100B, 100C, and 100D.

The imaging section 120A is provided with an imaging element such as a CCD (Charge Coupled Device) or a CMOS (Complementary Metal Oxide Semiconductor) to generate the taken image.

The imaging range of the imaging section 120A is the projection area 10A on which the projector 100A projects the image light, and the projection area adjacent to the projection area 10A. For example, the imaging range of the imaging section 120B of the projector 100B is a range in which the projection area 10B and a part or the whole of the projection areas 10A, 10C adjacent to the projection area 10B can be imaged.

The operation reception section 130A is provided with a plurality of operation keys for the user to provide a variety of instructions to the projector 100A. As the operation keys provided to the operation reception section 130A, there are cited a power key for switching between ON and OFF of the power, and a menu key for displaying a menu image for performing a variety of types of settings. When the user operates the variety of operation keys of the operation reception section 130A, the operation reception section 130A outputs an operation signal corresponding to the content of the operation thus received to the control section 170A.

Further, the operation reception section 130A can be provided with a configuration of receiving an infrared signal transmitted from a remote controller not shown, and then outputting an operation signal corresponding to the operation content represented by the infrared signal thus received to the control section 170A.

The image input I/F 140A is an interface for receiving the image data. The image input I/F 140A is coupled to the cable for image transmission to receive the image data supplied from the image supply device 300. The image input I/F 140A outputs the image data thus received to the image processing section 150A.

The image processing section 150A develops the image data thus input in the frame memory 155A and then processes the image data. The processing to be performed by the image processing section 150A includes, for example, a resolution conversion process, a shape correction process such as a distortion correction, a digital zooming process, a color compensation process, and a luminance correction process. The image processing section 150A performs the processing designated by the control section 170A, and performs the processing using a parameter input from the control section 170A as needed. Further, it is obviously possible for the image processing section 150A to perform two or more of the processing described above in combination with each other. The image processing section 150A retrieves the image data the processing on which has been completed from the frame memory 155A, and then outputs the image data thus retrieved to the image projection section 160A as image information.

Figure 3:
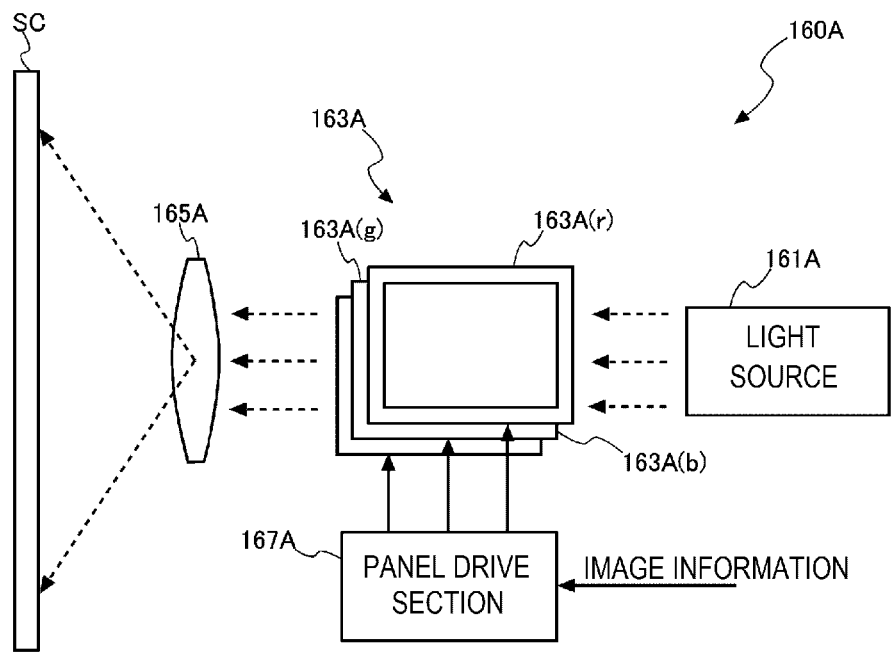
FIG. 3 is a diagram showing a schematic configuration of an image projection section.

FIG. 3 is a diagram showing a schematic configuration of the image projection section 160A. The image projection section 160A corresponds to a display section.

Here, the configuration of the image projection section 160A will be described with reference to FIG. 3.

The image projection section 160A modulates the light emitted from a light source 161A to generate the image light, and then projects the image light thus generated in an enlarged manner with an optical unit 165A. The image projection section 160A is provided with the light source 161A, three liquid crystal panels 163A(r), 163A(g), and 163A(b) as a light modulation device, the optical unit 165A, and a panel drive section 167A. The liquid crystal panels 163A(r), 163A(g), and 163A(b) provided to the projector 100A are hereinafter described as liquid crystal panels 163A when collectively referring to them.

The light source 161A includes a discharge type light source lamp such as a super high-pressure mercury lamp or a metal halide lamp, or a solid-state light source such as a light emitting diode or a semiconductor laser. The light having been emitted from the light source 161A enters the liquid crystal panel 163A. The liquid crystal panels 163A(r), 163A(g), and 163 (b) are each formed of a transmissive liquid crystal panel having a liquid crystal material encapsulated between a pair of transparent substrates, and so on. The liquid crystal panel 163A(r) modulates a red light beam, the liquid crystal panel 163A(g) modulates a green light beam, and the liquid crystal panel 163A(b) modulates a blue light beam. The liquid crystal panels are each provided with a pixel area constituted by a plurality of pixels arranged in a matrix, and are each arranged so that a drive voltage can be applied to the liquid crystal material pixel by pixel.

The image information output by the image processing section 150A is input to the panel drive section 167A. The panel drive section 167A applies the drive voltages corresponding to the image information thus input to the respective pixels in the pixel area to thereby set the pixels to respective light transmittances corresponding to the image information. The light emitted from the light source 161A is transmitted through the pixel area of each of the liquid crystal panels 163A(r), 163A(g), and 163A(b) to thereby be modulated pixel by pixel, and thus the image light corresponding to the image information is formed for each of the colored light beams. The colored light beams as the image light of the respective colors thus formed are combined with each other pixel by pixel by a color combining optical system not shown to turn to the image light representing a color image, and the image light is then projected on the projection surface 5 by the optical unit 165A in an enlarged manner.

The control section 170A is a computer device provided with a storage section 171A and a processor 180A. The control section 170A performs overall control of an operation of the projector 100A by the processor 180A operating in accordance with a control program 173A stored in the storage section 171A.

The storage section 171A is configured including memory devices such as a RAM (Random Access Memory) and a ROM (Read Only Memory). The RAM is used as a temporary storage of a variety of types of data, and the ROM stores the control program 173A for controlling the operation of the projector 100A, a variety of types of configuration information, and so on.

The storage section 171A stores the control program 173A to be executed by the processor 180A, and the taken image taken by the imaging section 120A. Further, the storage section 171A stores a pattern information table 175A to be generated by a spatial code generation section 181A described later.

The processor 180A is an arithmetic processing device formed of a CPU (Central Processing Unit) or an MPU (Micro Processing Unit). The processor 180A executes the control program 173A to control each section of the projector 100A. The processor 180A can be formed of a single processor, or can also be constituted by a plurality of processors. Further, the processor 180A can also be formed of an SoC (System-on-a-Chip) integrated with a part or the whole of the storage section 171A and other circuits. Further, the processor 180A can also be formed of a combination of the CPU for executing a program and a DSP for executing predetermined arithmetic processing. Further, it is also possible to adopt a configuration in which all of the functions of the processor 180A are implemented in hardware, or it is also possible to configure all of the functions of the processor 180A using a programmable device.

The control section 170A of the projector 100A is provided with the spatial code generation section 181A, a projection control section 183A, an imaging control section 185A, a color determination section 187A, a calibration data generation section 189A, and a calibration control section 191A as functional blocks. These functional blocks are functions realized by the processor 180A executing the arithmetic processing in accordance with the control program 173A described using the blocks for the sake of convenience.

The spatial code generation section 181A generates a spatial code.

The spatial code is identification information for identifying the plurality of projectors 100 constituting the position detection system 1A, and a plurality of feature regions 250 included in a pattern image 230. The pattern image is an image to be projected on the projection surface 5 for generating the calibration data. The feature regions 250 will be described later. The feature regions 250 correspond to the areas.

FIG. 4 is a diagram showing an example of a pattern information table 175A to be generated by the spatial code generation section 181A. In the pattern information table 175A, a first serial number, a second serial number, an identification number, a Y-coordinate and an X-coordinate of each of the feature regions 250, the spatial code, a color code, and so on are recorded as a single record.

The spatial code generation section 181A records the first serial number, the second serial number, the identification number, the Y-coordinate and the X-coordinate of each of the feature regions 250, and so on in the pattern information table 175A as a single record to generate the spatial code.

The first serial number is set by, for example, an operation of the operation reception section 130A by the user. In the present embodiment, "01" is set as the first serial number to the projector 100A, and "02" is set as the first serial number to the projector 100B. Further, "03" is set as the first serial number to the projector 100C, and "04" is set as the first serial number to the projector 100D.

First, the spatial code generation section 181A assigns the second serial number to each of the coordinates of the feature regions 250 set in advance. The feature regions 250 are each an area in which a color corresponding to a color code is formed in the pattern image 230. Each of the feature regions 250 can be formed of one pixel, or can also be formed of a plurality of pixels. The color code is a part of a code constituting the spatial code, and each of the color codes is associated with a color.

For example, the coordinate of the feature region 250 is set based on a coordinate system taking the upper left of the pattern image 230 as an origin, a vertical axis as the Y axis, and a horizontal axis as the X axis. The coordinate of the feature region 250 is a coordinate corresponding to the panel coordinate. In other words, the color of the color code associated with the coordinate of the feature region 250 is formed in the liquid crystal panel 163.

The spatial code generation section 181A first selects a row with the smallest Y-coordinate value, and then assigns the second serial numbers to the feature regions 250 in the row thus selected in the ascending order of the X-coordinate value. Then, the spatial code generation section 181A selects a row with the second smallest Y-coordinate value, and then assigns the second serial numbers to the feature regions 250 in the row thus selected in the ascending order of the X-coordinate value. The spatial code generation section 181A repeats these operations to set the second serial numbers to all of the feature regions 250 to be formed in the pattern image 230.

Then, the spatial code generation section 181A generates numbers each obtained by arranging the first serial number as high digits and the second serial number as low digits, and then converts the numbers thus generated into septenary numbers to generate the identification numbers.

For example, when the first serial number is "01," and the second serial number is "007," the number becomes "01007." Then, the spatial code generation section 181A converts the number thus generated into the septenary number to generate the identification number. For example, when the serial number in the decimal system is "01007," the septenary number is "01010."

Then, the spatial code generation section 181A converts each digit of the identification number into the color code. In the present embodiment, the color code "001" is set as "0"

in the septenary system, the color code "010" is set as "1" in the septenary system, and the color code "100" is set as "2" in the septenary system. Further, the color code "011" is set as "3" in the septenary system, the color code "101" is set as "4" in the septenary system, the color code "110" is set as "5" in the septenary system, and the color code "111" is set as "6" in the septenary system.

A code obtained by arranging the color codes in the arrangement sequence of the corresponding digits of the identification number forms the spatial code. For example, when the identification number is "01000," the color codes are "001," "010," "001," "001," "001," and thus, the spatial code is obtained as "001010001001001." Further, when the identification number is "01331," the color codes are "001," "010," "100," "100," "010," and thus, the spatial code is obtained as "001010100100010."

Further, since the identification number is a five-digit number, the identification number is converted into five color codes.

The color code corresponding to the fifth digit of the identification number is referred to as a first color code, the color code corresponding to the fourth digit of the identification number is referred to as a second color code, and the color code corresponding to the third digit of the identification number is referred to as a third color code. Further, the color code corresponding to the second digit of the identification number is referred to as a fourth color code, and the color code corresponding to the first digit of the identification number is referred to as a fifth color code.

At least one of the first color code, the second color code, the third color code, and the fourth color code corresponds to first partial information. Further, at least one of the second color code, the third color code, the fourth color code, and the fifth color code corresponds to second partial information.

As each of the color codes, there is set the corresponding color.

The three digits represented by each of the codes are associated with color components of red, green, and blue, respectively. Specifically, when the numerical value in the color code is "0," it is represented that the corresponding color component is not included, and when the numerical value in the code is "1," it means that the corresponding color component is included.

The color code "001" represents that the red component is included, and the color represented by the color code "001" is red.

The color code "010" represents that the green component is included, and the color represented by the color code "010" is green.

The color code "100" represents that the blue component is included, and the color represented by the color code "100" is blue.

The color code "011" represents that the red component and the green component are included, and the color represented by the color code "011" is yellow.

The color code "101" represents that the red component and the blue component are included, and the color represented by the color code "101" is magenta.

The color code "110" represents that the green component and the blue component are included, and the color represented by the color code "110" is cyan.

The color code "111" represents that the red component, the green component, and the blue component are included, and the color represented by the color code "111" is white.

The color code "000" represents that none of the red component, the green component, and the blue component is included, and the color represented by the color code "111" is black.

In the present embodiment, the color code is expressed by a combination of the color components of red, green, and blue. In other words, although it is possible to express 23 color codes, black is used as a pixel other than the feature regions 250 in the pattern image 230. Therefore, it is possible to express 23-1 color codes.

The projection control section 183A controls the image processing section 150A and the image projection section 160A to generate the image light based on the image data, and then projects the image light thus generated on the projection surface 5 in an enlarged manner. For example, the projection control section 183A makes the image processing section 150A perform generation of the pattern image data in which the colors corresponding to the color codes are formed in each of the feature regions 250 with reference to the pattern information table 175A generated by the spatial code generation section 181A. Specifically, the projection control section 183A first instructs the image processing section 150A to retrieve the first color code, and the Y-coordinate and the X-coordinate of the feature region 250, and then form the color corresponding to the first color code at the Y-coordinate and the X-coordinate thus retrieved. Further, the projection control section 183A instructs the image processing section 150A to form black in the area other than the feature regions 250 of the pattern image data. When the image processing section 150A generates the pattern image data in the frame memory 155A, the projection control section 183A controls the image processing section 150A and the image projection section 160A to generate the image light based on the pattern image data, and projects the image light thus generated on the projection surface 5. Thus, the pattern image 230a in which the color corresponding to the first color code is formed in each of the feature regions 250 is displayed on the projection surface 5.

When imaging of the pattern image in which the color corresponding to the first color code is formed in each of the feature regions 250 is terminated, the projection control section 183A then instructs the image processing section 150A to retrieve the second color code and the Y-coordinate and the X-coordinate of each of the feature regions 250, and then form the color corresponding to the second color code at the Y-coordinate and the X-coordinate thus retrieved.

Subsequently, the projection control section 183A repeats substantially the same processing to make the image processing section 150A generate the pattern image data in which the colors corresponding respectively to the third color code, the fourth color code, and the fifth color code are formed in the feature regions 250.

Thus, on the projection area 10A of the projection surface 5, there are sequentially displayed the pattern images in which the colors corresponding respectively to the first color code, the second color code, the third color code, the fourth color code, and the fifth color code are formed in each of the feature regions 250.

The pattern image 230 in which the color corresponding to the first color code is formed in each of the feature regions 250 is described as a pattern image 230a.

The pattern image 230 in which the color corresponding to the second color code is formed in each of the feature regions 250 is described as a pattern image 230b.

The pattern image 230 in which the color corresponding to the third color code is formed in each of the feature regions 250 is described as a pattern image 230c.

The pattern image 230 in which the color corresponding to the fourth color code is formed in each of the feature regions 250 is described as a pattern image 230d.

The pattern image 230 in which the color corresponding to the fifth color code is formed in each of the feature regions 250 is described as a pattern image 230e.

The pattern image 230a corresponds to a first pattern image. Further, when the pattern image 230a corresponds to the first pattern image, the pattern image 230b corresponds to a second pattern image.

Further, the pattern image 230b corresponds also to the first pattern image. Further, when the pattern image 230b corresponds to the first pattern image, the pattern image 230c corresponds to the second pattern image. Hereinafter, the same applies to the pattern image 230c, the pattern image 230d, and the pattern image 230e.

Besides the above, the projection control section 183A makes the image processing section 150A generate the image data for displaying images of the three primary colors of red, green, and blue, and black on the entire surface of the projection area 10A, respectively.

The imaging control section 185A controls the imaging section 120A to make the imaging section 120A generate the taken image. When the imaging control section 185A receives the notice that the projection of the pattern image is completed from the projection control section 183A, the imaging control section 185A makes the imaging section 120A perform imaging. The imaging section 120A outputs the taken image thus generated to the control section 170A. The imaging control section 185A makes the storage section 171A store the taken image generated by the imaging section 120A.

The color determination section 187A retrieves the taken images in which the pattern images 230a, 230b, 230c, 230d, and 230e are respectively imaged from the storage section 171A.

Hereinafter, the taken image in which the pattern image 230a is imaged is referred to as a first taken image, the taken image in which the pattern image 230b is imaged is referred to as a second taken image, and the taken image in which the pattern image 230c is imaged is referred to as a third taken image. Further, the taken image in which the pattern image 230d is imaged is referred to as a fourth taken image, and the taken image in which the pattern image 230e is imaged is referred to as a fifth taken image.

The color determination section 187A performs a color determination process of determining the color of each of the feature regions 250 imaged in the first through fifth taken images.

The calibration data generation section 189A performs a spatial code detection process and a data generation process. The calibration data generation section 189A restores the spatial code based on the color of each of the feature regions 250 in the first through fifth taken images determined by the color determination section 187A.

The calibration data generation section 189A converts the colors of the feature regions 250 at the same position in the first taken image through the fifth taken image into the color codes, and then arranges the color codes thus converted in the order of the first taken image through the fifth taken image to restore the spatial code.

Then, the calibration data generation section 189A generates the calibration data with reference to the pattern information table 175A.

The calibration data generation section 189A generates the calibration data for associating the imaging coordinates of the first taken image through the fifth taken image in which the spatial codes are detected, and the panel coordinates registered in the pattern information table 175A with each other. Due to the calibration data, positions on the taken image generated by the imaging section 120A are converted into positions on the liquid crystal panel 163.

Further, when the spatial code the same in value as the spatial code restored at a certain imaging coordinate is restored at an imaging coordinate which is not adjacent to that imaging coordinate, the calibration data generation section 189A does not use these spatial codes in the generation of the calibration data. For example, when a member high in reflectance such as a mirror is located near to the projection surface 5, the spatial code false in value is restored in some cases. Therefore, when there are included the spatial codes the same in value at the imaging coordinates not adjacent to each other, the calibration data generation section 189A does not use these spatial codes in the generation of the calibration data.

The calibration control section 191A is a function provided only to the projector 100A which functions as the master machine.

The calibration control section 191A instructs display of the pattern image, imaging of the projection surface 5, and so on to the projectors 100B, 100C, and 100D.

Figure 5:
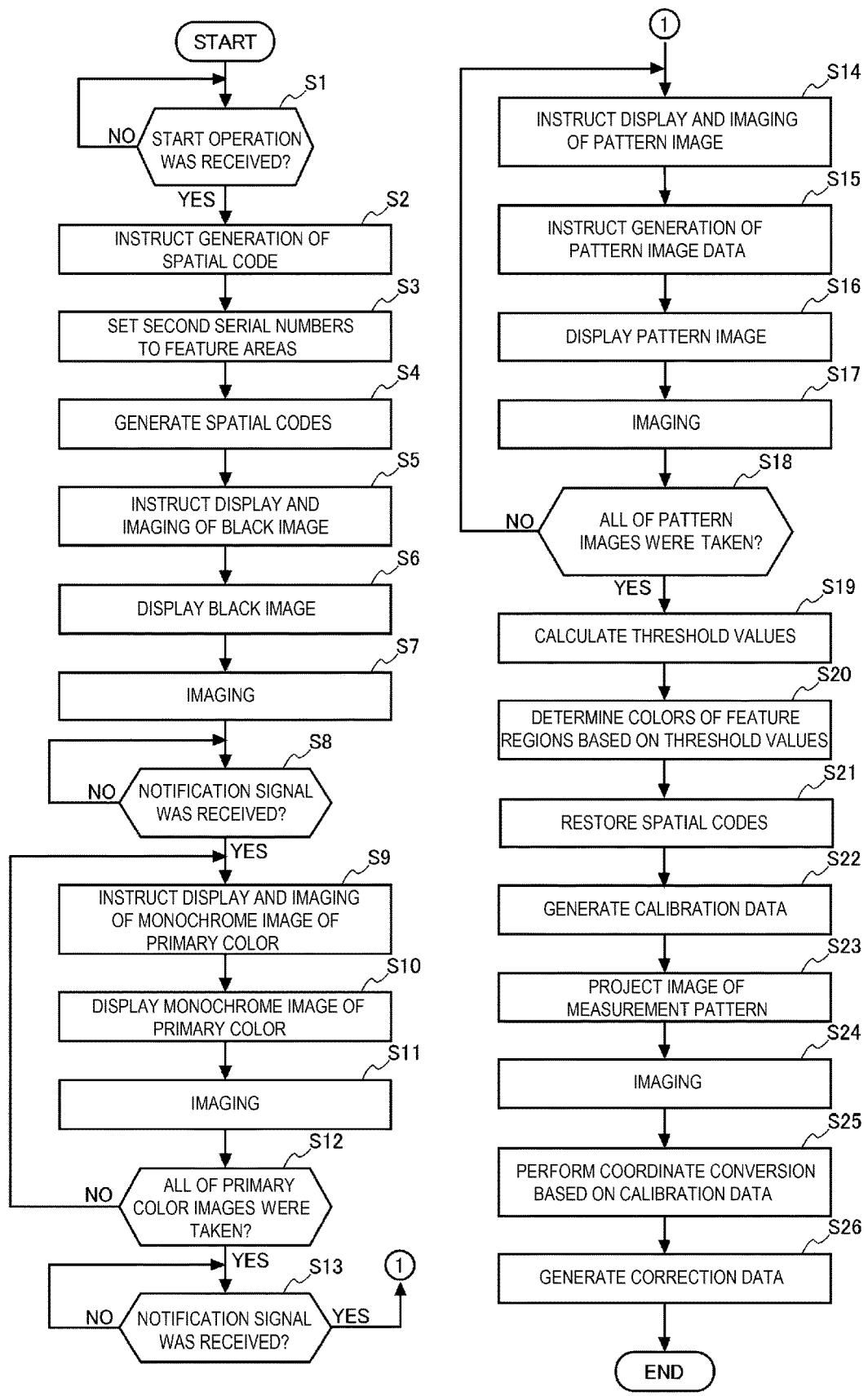
FIG. 5 is a flowchart showing an operation of the projector.

FIG. 5 is a flowchart showing the operation of the projector 100A as the master machine.

The operation of the projector 100A will be described with reference to the flowchart shown in FIG. 5. In the position detection system 1A according to the present embodiment, the projector 100A and the projector 100C the projection areas 10 of which are not adjacent to each other project images such as the pattern images 230 on the projection surface 5 at the same time to generate the calibration data. Subsequently, the projector 100B and the projector 100D project images such as the pattern images 230 on the projection surface at the same time to generate the calibration data in accordance with the control by the projector 100A. Thus, the time required for the generation of the calibration data is reduced.

In the following description, when the projectors 100A, 100C project the images on the projection surface 5 at the same time to generate the calibration data will only be described, and the description of the operations of the projector 100B and the projector 100D will be omitted.

First, the control section 170A determines (step S1) whether or not the operation of instructing a start of the calibration has been received by the operation reception section 130A. When the control section 170A has not received the operation (NO in the step S1), the control section 170A stands ready to start the process until the control section 170A receives the operation.

When the control section 170A has received the operation (YES in the step S1), the control section 170A instructs (step S2) generation of the spatial code to the projectors 100B, 100C, and 100D. Then, the control section 170A sets (step S3) the second serial numbers to the feature regions 250 set in advance. The control section 170A registers the first serial numbers set by the user and the second serial numbers thus set in the pattern information table 175A so as to be associated with the coordinates of the feature regions 250.

Then, the control section 170A generates (step S4) the spatial codes. The control section 170A generates numbers each obtained by arranging the first serial number as high digits and the second serial number as low digits, and then converts the numbers thus generated into the septenary numbers to generate the identification numbers. Then, the control section 170A converts each of the digits of the identification number thus generated into the color code to generate the spatial code.

Then, the control section 170A outputs (step S5) the instruction signal of instructing the display and imaging of a black image to the projectors 100B, 100C, and 100D.

Figure 6:
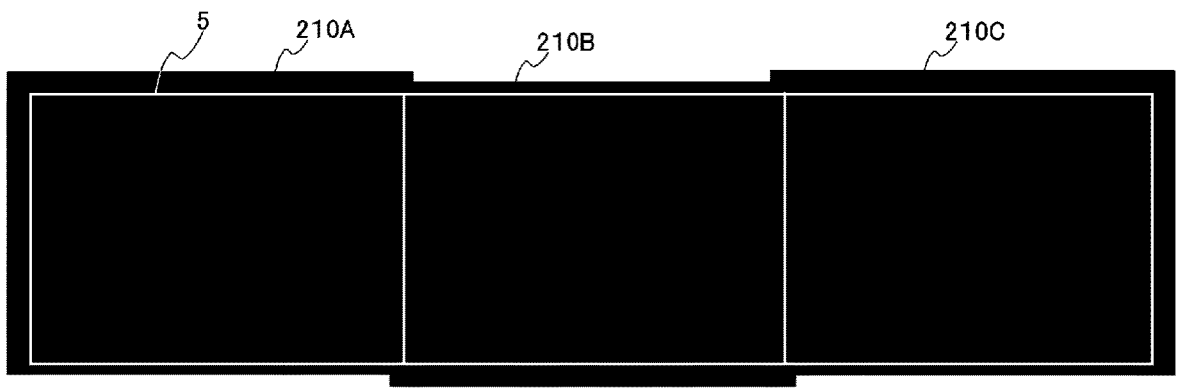
FIG. 6 is a diagram showing a projection surface on which black images are displayed.

After the control section 170A output the instruction signal to the projectors 100B, 100C, and 100D, the control section 170A makes the image processing section 150A generate black image data for displaying a black image on the entire surface of the projection area 10A. The image processing section 150A generates the black image data in the frame memory 155A, and then outputs the black image data thus generated to the image projection section 160A as the image information. The image projection section 160A generates the image light based on the image information thus input, and then projects the image light thus generated on the projection surface 5 in an enlarged manner. Thus, the black image is displayed (step S6) in the entire area of the projection surface 5. FIG. 6 is a diagram showing the state in which the black images 210A, 210C are displayed on the projection surface 5. It should be noted that FIG. 6 shows the state in which the display is performed only in the projection areas 10A, 10B, and 10C on the projection surface 5. This is because, the description of the operations of the projectors 100B, 100D is omitted. FIG. 6 shows the projection surface 5 on which the black image 210A is displayed in the projection area 10A, the black image 210B is displayed in the projection area 10B, and the black image 210C is displayed in the projection area 10C.

Then, the control section 170A makes the imaging section 120A perform imaging (step S7) to generate the taken image obtained by imaging a range including the projection area 10A. The control section 170A makes the storage section 171A store the taken image generated by the imaging section 120A. The taken image obtained by taking the black image is hereinafter referred to as a black taken image.

Then, the control section 170A determines (step S8) whether or not a notification signal has been received from the projectors 100B, 100C, and 100D. The notification signal is a signal for giving notice that the generation of the black taken image is completed. When there is the projector 100 from which the notification signal has not been received (NO in the step S8), the control section 170A waits until the notification signals are received from all of the projectors 100.

When the control section 170A has received the notification signals from all of the projectors 100B, 100C, and 100D (YES in the step S8), the control section 170A outputs (step S9) an instruction signal of instructing display and imaging of a monochrome image of a primary color to the projector 100C. For example, the control section 170A first outputs an instruction signal of instructing the display and the imaging of the monochrome image of red to the projector 100C.

Figure 7:
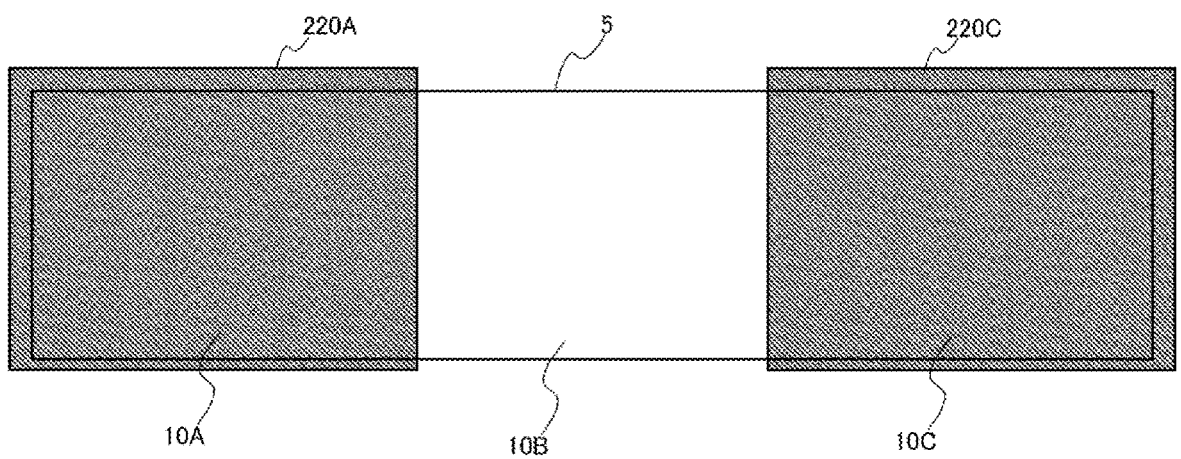
FIG. 7 is a diagram showing the projection surface on which monochrome images of a primary color are displayed.

Then, the control section 170A makes the image processing section 150A generate red image data for displaying a red image on the entire surface in the projection area 10A. The image processing section 150A generates the red image data in the frame memory 155A, and then outputs the red image data thus generated to the image projection section 160A as the image information. Thus, the red image is displayed (step S10) on the entire surface in the projection areas 10A and 10C. FIG. 7 shows a state in which the red image 220A is displayed in the projection area 10A of the projection surface 5, and the red image 220C is displayed in the projection area 10C.

Then, the control section 170A makes the imaging section 120A perform imaging (step S11) to generate the taken image obtained by imaging a range including the projection area 10A. The control section 170A makes the storage section 171A store the taken image generated by the imaging section 120A. The taken image obtained by taking the red image is hereinafter referred to as a first primary-color taken image.

Then, the control section 170A displays monochrome images of all of the primary colors on the projection surface 5 to determine (step S12) whether or not the monochrome image has been taken.

When the taken images of all of the primary colors have not been generated (NO in the step S12), the control section 170A returns to the step S9, and then repeats the steps S9 through S12 with respect to the green color and the blue color in substantially the same manner. The taken image obtained by taking the green image is hereinafter referred to as a second primary-color taken image, and the taken image obtained by taking the blue image is hereinafter referred to as a third primary-color taken image.

When the generation of the taken images of all of the primary colors is completed (YES in the step S12), the control section 170A determines (step S13) whether or not the notification signal has been received from the projector 100C. This notification signal is a signal of giving notice that the projector 100C has generated the taken image of the monochrome image instructed in the step S9. When the control section 170A has not received the notification signal (NO in the step S13), the control section 170A waits until the control section 170A receives the notification signal.

Figure 8:
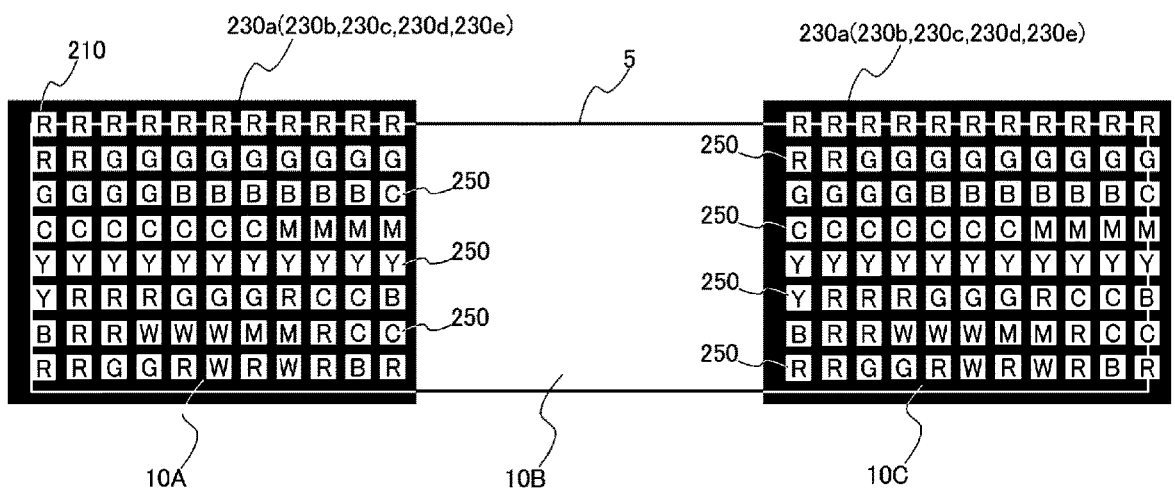
FIG. 8 is a diagram showing the projection surface on which pattern images are displayed.

When the control section 170A has received the notification signal from the projector 100C (YES in the step S13), the control section 170A outputs (step S14) an instruction signal of instructing the display and the imaging of the pattern image 230a in which the color corresponding to the first color code is formed to the projector 100C. Then, the control section 170A instructs (step S15) generation of the pattern image data in which the color corresponding to the first color code is formed to the image processing section 150A. The control section 170A instructs (step S15) the image processing section 150A to retrieve the first color code in the spatial code generated in the step S4, and the coordinate values of the feature region 250, and then form the color corresponding to the first color code at the Y-coordinate and the X-coordinate thus retrieved. When the image processing section 150A generates the pattern image data in the frame memory 155A, the projection control section 183A controls the image processing section 150A and the image projection section 160A to generate the image light based on the pattern image data, and projects the image light thus generated on the projection surface 5. Thus, the pattern image 230a in which the color corresponding to the first color code is formed in each of the feature regions 250 is displayed (step S16) on the projection areas 10A and 10C. FIG. 8 shows a state in which the pattern image 230a is displayed in each of the projection areas 10A, 10C of the projection surface 5. As shown in FIG. 8, a black image is displayed in an area of the pattern image 230a where the feature regions 250 are not formed. Processing of displaying the pattern image 230a in each of the projection areas 10A and 10C is referred to as a first display process.

Then, the control section 170A makes the imaging section 120A perform imaging (step S17) to generate the taken image obtained by imaging a range including the projection area 10A. The control section 170A makes the storage section 171A store the taken image generated by the imaging section 120A. The taken image obtained by taking the pattern image in which the color corresponding to the first color code is formed is referred to as a first pattern taken image. Processing of taking the first pattern taken image is referred to as a first imaging process.

Then, the control section 170A displays the pattern image 230 in which the colors corresponding to all of the color codes from the first color code through the fifth color code are formed on the projection surface 5, and then determines (step S18) whether or not the taken images have been generated. When the control section 170A has not generated the taken images of all of the pattern images 230 (NO in the step S18), the control section 170A returns to the processing in the step S17. The control section 170A similarly repeats the processing of the steps S14 through S17 with respect also to the second color code, the third color code, the fourth color code, and the fifth color code. The taken image obtained by taking the pattern image 230b in which the color corresponding to the second color code is formed is hereinafter referred to as a second pattern taken image. Further, the taken image obtained by taking the pattern image 230c in which the color corresponding to the third color code is formed is referred to as a third pattern taken image. The taken image obtained by taking the pattern image 230d in which the color corresponding to the fourth color code is formed is referred to as a fourth pattern taken image. The taken image obtained by taking the pattern image 230e in which the color corresponding to the fifth color code is formed is referred to as a fifth pattern taken image.

Processing of displaying the pattern 230b in the projection areas 10A and 10C is referred to as a second display process, and processing of generating the second pattern taken image is referred to as a second imaging process.

When the control section 170A has generated all of the taken images from the first pattern taken image through the fifth pattern taken image (YES in the step S18), the control section 170A calculates (step S19) a threshold value. The control section 170A calculates the threshold values for determining the colors of the feature regions 250 formed in the first pattern taken image through the fifth pattern taken image based on the black taken image generated in the step S7, and the first primary-color taken image, the second primary-color taken image, and the third primary-color taken image generated in the step S11. The control section 170A calculates the threshold value for each of the primary colors and each of the feature regions 250.

Then, the control section 170A determines (step S20) the colors of the feature regions 250 imaged in the first pattern taken image through the fifth pattern taken image generated in the step S17 based on the threshold values calculated in the step S19. The control section 170A determines colors of the feature regions 250 imaged in the first pattern taken image through the fifth pattern taken image, and then converts the colors thus determined into the respective color codes. Subsequently, the control section 170A arranges the color codes of the colors of the feature regions 250 imaged at the same position of the first pattern taken image through the fifth pattern taken image in sequence to restore the spatial code (step S21).

The control section 170A restores the spatial code for each of the feature regions 250, and then obtains the panel coordinate associated with the spatial code thus restored with reference to the pattern information table 175A. Then, the control section 170A generates (step S22) the calibration data in which the coordinate of the taken image in which the spatial code thus restored is detected, and the panel coordinate thus obtained are associated with each other. In other words, the control section 170A generates the calibration data of converting the taken image coordinate into the panel coordinate. The control section 170A makes the storage section 171A store the calibration data thus generated.

Then, the control section 170A generates correction data. The correction data is data to be used for the shape correction such as a keystone distortion correction, or the color correction of the image data. When generating the correction data to be used for the color correction will hereinafter be described.

The control section 170A first instructs the image processing section 150A to generate the image data of a measurement pattern set in advance. The image processing section 150A generates the image data of the measurement pattern in the frame memory 155A, and then outputs the image data of the measurement pattern thus generated to the image projection section 160A as the image information. Thus, the image of the measurement pattern is displayed (step S23) on the entire surface of the projection area 10A.

Then, the control section 170A makes the imaging section 120A perform imaging (step S24) to generate the taken image obtained by imaging a range including the projection area 10A. The control section 170A makes the storage section 171A store the taken image generated by the imaging section 120A.

Then, the control section 170A retrieves the taken image from the storage section 171A, selects pixels included in the taken image thus retrieved, and then performs (step S25) the coordinate conversion of the coordinates of the pixels thus selected into the panel coordinates using the calibration data. Subsequently, the control section 170A generates the correction data to be used for the color correction based on pixel values in the panel coordinate thus converted, and the pixel values of the pixels of the taken image thus selected. The control section 170A repeatedly performs the processing described above with respect to all of the pixels of the taken image or the pixel at the representative point set therein to thereby generate (step S26) the correction data.

Then, a calculation method of the threshold values for determining the colors of the feature regions 250 of the pattern image will be described.

First, the control section 170A subtracts the pixel value of the pixel corresponding to the black taken image generated in the step S5 from the pixel values of the pixels of the first primary-color taken image, the second primary-color taken image, and the third primary-color taken image generated in the step S9. This is the processing of removing an influence of a background including environmental light and so on from the first primary-color taken image, the second primary-color taken image, and the third primary-color taken image.

Then, the control section 170A obtains the pixel value of red at the reference position from the first primary-color taken image from which the influence of the background is removed. Similarly, the control section 170A obtains the pixel value of green at the reference position from the second primary-color taken image from which the influence of the background is removed, and obtains the pixel value of blue at the reference position from the third primary-color taken image from which the influence of the background is removed. As the reference position, it is possible to select, for example, the pixel located at the center of the taken image, but is not limited to the center of the taken image.

For example, in the following description, it is assumed that the pixel value of red at the reference position obtained from the first primary-color taken image is 87, the pixel value of green at the reference position obtained from the second primary-color taken image is 144, and the pixel value of blue at the reference position obtained from the third primary-color taken image is 71.

Then, the control section 170A obtains the pixel value of red in each of the feature regions 250 in the first primary-color taken image, the pixel value of green in each of the feature regions 250 in the second primary-color taken image, and the pixel value of blue in each of the feature regions 250 in the third primary-color taken image. Since the threshold value is generated for each of the feature regions 250, the control section 170A obtains the pixel value for each of the feature regions 250.

For example, in the following description, it is assumed that the pixel value of red in the feature region 250 obtained is 79, the pixel value of green in the feature region 250 obtained is 137, and the pixel value of blue in the feature region 250 obtained is 69.

The control section 170A sets a value obtained by multiplying the ratio between the pixel value at the reference position and the pixel value in the feature region 250 by 0.5 as the threshold value of each color.

For example, the threshold value Rt of red becomes 79/87×0.5=0.45, the threshold value Gt of green becomes 137/144×0.5=0.48, and the threshold value Bt of blue becomes 69/71×0.5=0.49. The control section 170A calculates these threshold values for each of the feature regions 250.

Then, the control section 170A determines the color of each of the feature regions 250 based on the threshold values thus calculated.

First, the control section 170A obtains the pixel values of red, green, and blue of the pixels at the reference position from each of the first primary-color taken image, the second primary-color taken image, and the third primary-color taken image in which the pixel value of the black taken image is subtracted to thereby remove the influence of the background.

The pixel values of red, green, and blue at the reference position obtained from the first primary-color taken image are described as (Rr, Gr, Br).

The pixel values of red, green, and blue at the reference position obtained from the second primary-color taken image are described as (Rg, Gg, Bg).

The pixel values of red, green, and blue at the reference position obtained from the third primary-color taken image are described as (Rb, Gb, Bb).

Then, the control section 170A obtains a determinant for converting the pixel values of red, green, and blue of each of the first through fifth pattern taken images into the pixel values of red, green, and blue of an image displayed by the projector 100A. When the target is the first pattern taken image will hereinafter be described.

Considering the pixel values of red, green, and blue of the image displayed by the projector 100A which are normalized into 0 through 1, the control section 170A first creates a matrix M obtained by arranging (Rr, Gr, Br), (Rg, Gg, Bg), and (Rb, Gb, Bb). The matrix M is described as follows.

$$M = \begin{pmatrix} R_r & R_g & R_b \\ G_r & G_g & G_b \\ B_r & B_g & B_b \end{pmatrix}$$

Then, the control section 170A obtains an inverse matrix of the matrix M to convert the pixel values of red, green, and blue of the first pattern taken image into the pixel values of red, green, and blue of the image displayed by the projector 100A using Formula (1) described below.

$$\begin{pmatrix} R_{pj} \\ G_{pj} \\ B_{pj} \end{pmatrix} = \begin{pmatrix} R_r & R_g & R_b \\ G_r & G_g & G_b \\ B_r & B_g & B_b \end{pmatrix}^{-1} \begin{pmatrix} R_c \\ G_c \\ B_c \end{pmatrix} \quad (1)$$

A vector (Rc, Gc, Bc) shown in Formula (1) described above represents the pixel values of red, green, and blue of the first pattern taken image. Further, a vector (Rpj, Gpj, Bpj) represents the pixel values of red, green, and blue of the image displayed by the projector 100A.

For example, it is assumed that the pixel values of red, green, and blue at the reference position in the first primary-color taken image are (Rr, Gr, Br)=(87, 20, 6). It is assumed that the pixel values of red, green, and blue at the reference position in the second primary-color taken image are (Rg, Gg, Bg)=(38, 144, 23). Further, it is assumed that the pixel values of red, green, and blue at the reference position in the third primary-color taken image are (Rb, Gb, Bb)=(3, 16, 71).

Further, it is assumed that the pixel values of red, green, and blue of the first pattern taken image are (57, 148, 90), respectively. In this case, the control section 170A substitutes the values in Formula (1) described above to convert the pixel values of red, green, and blue of the first pattern taken image into the pixel values of red, green, and blue of the image displayed by the projector 100A. The conversion equation is described as Formula (2) below.

$$\begin{pmatrix} R_{pj} \\ G_{pj} \\ B_{pj} \end{pmatrix} = \begin{pmatrix} 87 & 38 & 3 \\ 20 & 144 & 16 \\ 6 & 23 & 71 \end{pmatrix}^{-1} \begin{pmatrix} 57 \\ 148 \\ 90 \end{pmatrix} \quad (2)$$

Due to the calculation of Formula (2) described above, the pixel values of red, green, and blue of the image displayed by the projector 100A are obtained as (0.23, 0.89, 0.96). The control section 170A compares the pixel values of red, green, and blue with the respective threshold values to thereby binarize the pixel values.

The pixel value of red is 0.23, and is smaller in value than the threshold value Rt=0.45.

The pixel value of green is 0.89, and is larger in value than the threshold value Gt=0.48.

The pixel value of blue is 0.96, and is larger in value than the threshold value Bt=0.49.

Therefore, the control section 170A determines that the first color code of the target feature region 250 is (0, 1, 1). The control section 170A determines the color code of each of the feature regions 250 with respect to the second pattern taken image through fifth pattern taken image in substantially the same manner. The control section 170A arranges the values of the first color code, the second color code, the third color code, the fourth color code, and the fifth color code in this order to restore the spatial code, and then obtains the coordinate corresponding to the spatial code with reference to the pattern information table 175A. Thus, the calibration data of converting the taken image coordinate into the panel coordinate is generated.

Figure 9:
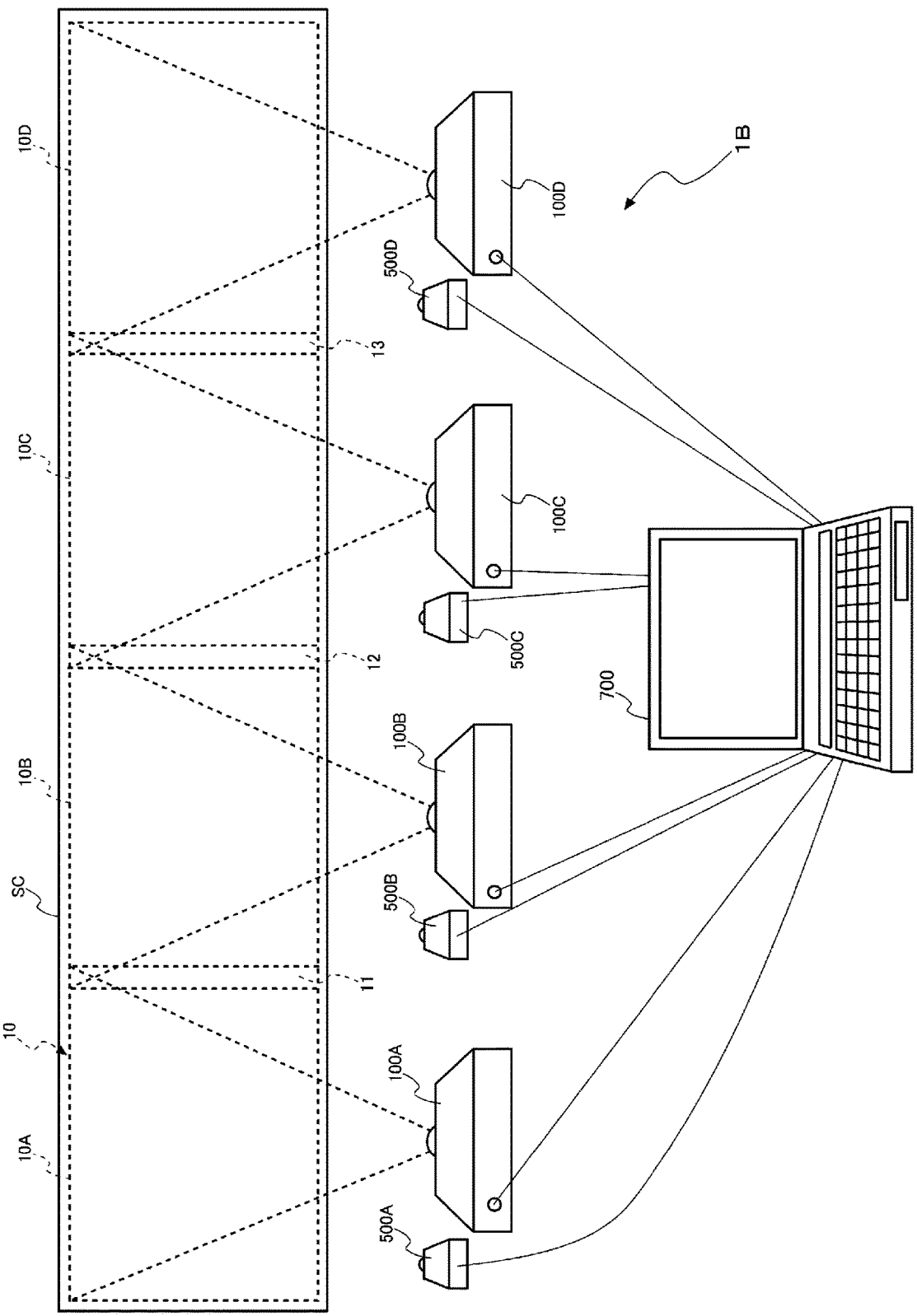
FIG. 9 is a diagram showing a configuration of a modified example of a position detection system.

FIG. 9 is a block diagram showing a configuration of a position detection system 1B according to a modified example.

The position detection system 1B shown in FIG. 9 has a configuration provided with imaging devices 500A, 500B, 500C, and 500D and a control device 700.

The control device 700 functions as the image supply device 300 in the embodiment described above, and supplies the projectors 100A, 100B, 100c, and 100D with the image data.

Further, the control device 700 functions as the projector 100A in the embodiment described above, and controls operations of the projectors 100A, 100B, 100c, and 100D. When generating the calibration data, the control device 700 controls the projectors 100A, 100B, 100C, and 100D to display the monochrome images of the primary colors and the pattern image 230 in the projection areas 10A, 10B, 10C, and 10D, respectively. Further, the control device 700 controls the imaging devices 500A, 500B, 500C, and 500D to image the projection surface SC.

The imaging range of the imaging device 500A is a range including the projection area 10A and the projection area 10B adjacent to the projection area 10A. The imaging device 500A images the imaging range to generate the taken image in response to an instruction signal input from the control device 700. The imaging device 500A outputs the taken image thus generated to the control device 700.

The imaging range of the imaging device 500B is a range including the projection area 10B, and the projection areas 10A and 10C adjacent to the projection area 10B. The imaging device 500B images the imaging range to generate the taken image in response to the instruction signal input from the control device 700. The imaging device 500B outputs the taken image thus generated to the control device 700.

The imaging range of the imaging device 500C is a range including the projection area 10C, and the projection areas 10B and 10D adjacent to the projection area 10C. The imaging device 500C images the imaging range to generate the taken image in response to the instruction signal input from the control device 700. The imaging device 500C outputs the taken image thus generated to the control device 700.

The imaging range of the imaging device 500D is a range including the projection area 10D and the projection area 10C adjacent to the projection area 10D. The imaging device 500D images the imaging range to generate the taken image in response to the instruction signal input from the control device 700. The imaging device 500D outputs the taken image thus generated to the control device 700.

The control device 700 generates the calibration data in which the taken image coordinate and the panel coordinate are associated with each other based on the taken images input from the imaging devices 500A, 500B, 500C, and 500D.

Even in such a configuration in which the projectors 100 are not provided with the imaging sections 120, and the projection surface SC is imaged by the imaging devices 500 coupled externally, it is possible to obtain substantially the same advantages as those of the position detection system 1A described above.

As described hereinabove, the projector 100A according to the present embodiment executes the first display process, the first imaging process, the second display process, the second imaging process, the color determination process, the spatial code detection process, and the data generation process.

The first display process is the processing of displaying the first pattern image on the projection surface 5, wherein the first pattern image has the plurality of feature regions 250, and the color associated with the first color code obtained by dividing the spatial code set to each of the feature regions 250 is formed in corresponding one of the feature regions 250.

The first imaging process is the processing of obtaining the first pattern taken image obtained by imaging the projection surface 5 on which the first pattern image is projected.

The second display process is the processing of displaying the second pattern image on the projection surface 5, wherein the second pattern image has the plurality of feature regions 250, and the color associated with the second color code as the information other than the first color code of the spatial code set to each of the feature regions 250 is formed in corresponding one of the feature regions 250.

The second imaging process is the processing of obtaining the second pattern taken image obtained by imaging the projection surface 5 on which the second pattern image is projected.

The color determination process is the processing of respectively determining the colors of the plurality of feature regions 250 imaged in the first pattern taken image, and the colors of the plurality of feature regions 250 imaged in the second pattern taken image.

The spatial code detection process is the processing of obtaining the first partial information and the second partial information respectively set to the corresponding feature regions 250 of the first pattern taken image and the second pattern taken image based on the determination result of the colors in the plurality of feature regions 250, and then detecting the spatial code set to each of the feature regions 250 based on the first partial information and the second partial information thus obtained.

The data generation process is the processing of generating the calibration data of associating the position of the image displayed on the projection surface 5 and the position of the taken image obtained by imaging the range including the projection surface 5 with each other based on the spatial code thus detected.

An arrangement sequence is defined in the plurality of spatial codes set to the plurality of feature regions 250, and the plurality of spatial codes is respectively set to the plurality of feature regions 250 in accordance with the order set in advance. Therefore, even when some of the spatial codes cannot be detected, it is possible to interpolate the spatial codes which failed to be detected. Therefore, even when it is unachievable to detect all of the spatial codes, it is possible to generate the calibration data of associating the position of the image displayed on the projection surface 5 and the position of the taken image obtained by imaging the range including the projection surface 5 with each other.

The projector 100A executes the threshold value calculation process.

In the threshold value calculation process, first, the primary-color images of the colors set to the plurality of feature regions 250 are displayed on the projection surface 5. Then, the plurality of primary-color taken images obtained by imaging the projection surface 5 on which the primary-color images are displayed is obtained. Then, the threshold value for determining the primary color formed in each of the feature regions 250 of the first pattern taken image and the second pattern taken image is calculated for each of the feature regions 250 based on the ratio between the pixel value of the reference point set in advance of the primary-color taken image and the pixel value in corresponding one of the feature regions 250 imaged in the primary-color taken image.

The projector 100A determines the color formed in each of the feature regions 250 in the first pattern taken image and the second pattern taken image using the threshold values thus calculated.

Therefore, it is possible to accurately determine the color formed in each of the feature regions 250 of the first pattern taken image and the second pattern taken image.

The spatial code includes the first serial number set to the display device for displaying the first pattern image and the second pattern image on the projection surface 5.

Therefore, it is possible to identify the images which are displayed on the projection surface 5 by the plurality of projectors 100.

The spatial code is an identification number obtained by converting a number constituted by the first serial number set to the projector 100 for displaying the first pattern image and the second pattern image on the projection surface 5, and the second serial number associated with each of the coordinates of the plurality of feature regions 250 in the first pattern image and the second pattern image into a septenary number.

Each of the digits included in the spatial code is associated with a color expressed by a combination of the primary colors of red, green, and blue.

Therefore, it is possible to display the color corresponding to the spatial code using the combination of the primary colors of red, green, and blue.

The embodiment described above is a preferred embodiment of the present disclosure. It should be noted that the present disclosure is not limited to the embodiment described above, but can be implemented with a variety of modifications within the scope or the spirit of the present disclosure.

For example, although in the embodiment described above, the description is presented citing when the identification information set to the feature region 150 is the spatial code of the serial numbers as an example, the identification information can be characters or symbols the arrangement sequence of which is defined in advance. It is possible to set the characters or the symbols the arrangement sequence of which is defined in advance to the plurality of feature regions 250 in accordance with the sequence set in advance.

Further, for example, in the embodiment described above, the light modulation device provided with the liquid crystal panels 163 is illustrated, but the liquid crystal panels 163 can be transmissive liquid crystal panels or can also be reflective liquid crystal panels. Further, the light modulation device can be provided with a configuration using digital mirror devices instead of the liquid crystal panels 163. Further, it is also possible to adopt a configuration having the digital mirror devices and a color wheel combined with each other. Further, besides the liquid crystal panels or the digital mirror devices, configurations capable of modulating the light emitted by the light source can also be adopted as the light modulation device.

Further, each of the functional sections of the projector 100A shown in FIG. 2 is for showing the functional configuration, and the specific installation forms are not particularly limited. In other words, it is not necessarily required to install the hardware individually corresponding to each of the functional sections, but it is obviously possible to adopt a configuration of realizing the functions of the plurality of functional sections by a single processor executing a program. Further, apart of the function realized by software in the embodiment described above can also be realized by hardware, and a part of the function realized by hardware can also be realized by software. Besides the above, the specific detailed configuration of each of other sections than the projector can arbitrarily be modified within the scope or the spirit of the present disclosure.

Further, the processing unit of the flowchart shown in FIG. 5 is obtained by dividing the process of the projector 100 in accordance with major processing contents in order to make the processing of the projector 100A easy to understand. The scope of the present disclosure is not limited by the way of the division or the names of the processing units shown in the flowchart of FIG. 5. Further, the processing of the control section 170A can also be divided into a larger number of processing units, or can also be divided so that one processing unit includes a larger amount of processing in accordance with the processing contents. Further, the processing sequence of the flowchart described above is not limited to the illustrated example.

Further, when realizing the position detection method using a computer provided to the projector 100, it is also possible to configure the program to be executed by the computer as an aspect of a recording medium, or an aspect of a transmission medium for transmitting the program. As the recording medium, there can be used a magnetic or optical recording medium, or a semiconductor memory device. Specifically, there can be cited a portable or rigid recording medium such as a flexible disk, an HDD (Hard Disk Drive), a CD-ROM, a DVD, a Blu-ray disc, a magnetooptic disc, a flash memory, or a card-type recording medium. Further, the recording medium described above can also be a RAM, or a nonvolatile storage device such as a ROM or the HDD as an internal storage device provided to the server device. Blu-ray is a registered trademark.

What is claimed is:
1. A position detection method comprising:
projecting a first pattern image on a display surface, the first pattern image including a first region having a first color which corresponds to a first portion of a first identification information indicating the first region and a second region having a second color corresponding to a first portion of a second identification information indicating the second region, an order of the first identification information and the second identification information is predetermined;
obtaining a first captured image by capturing the display surface on which the first pattern image is projected;
projecting a second pattern image onto the display surface, the second pattern image including the first region having a third color which corresponds to a second portion of the first identification information which is different from the first portion and the second region having a fourth color corresponding to a second portion of the second identification information which is different from the first portion;
obtaining a second captured image by capturing the display surface on which the second pattern image is projected;
associating a first position in an image projected on the display surface with a second position in a third captured image that obtained by capturing the display surface on which the image is projected, based on the first color and the second color which are detected in the first captured image, and the third color and the fourth color which are detected in the second captured image.

2. The position detection method according to claim 1, further comprising:
   projecting a single-color image of primary color on the display surface;
   obtaining a fourth captured image by capturing the display surface on which the single-color image is projected;
   calculating a threshold value used to detecting the first color based on a ratio of a pixel value of a reference position in the fourth captured image and a pixel value of the first region in the fourth captured image; and
   detecting the first color using the threshold value.

3. The position detection method according to claim 1, wherein
   the first identification information includes information indicating a display device that projects the first pattern image and the second pattern image.

4. The position detection method according to claim 1, wherein
   the first identification information is an identification number obtained by converting a number into a septenary number, the number including a first serial number indicating a display device that projects the first pattern image and the second pattern image, and a second serial number corresponding to coordinates of the first region;
   a combination of each numbers included in the identification number corresponds to a color represented by a combination of primary colors of red, green, and blue.

5. A display device comprising:
   an optical device;
   an imaging device;
   at least one processor which controls the display device and the imaging device, and configured to execute:
      projecting a first pattern image on a display surface, the first pattern image including a first region having a first color which corresponds to a first portion of a first identification information indicating the first region and a second region having a second color which corresponds to a first portion of a second identification information indicating the second region, an order of the first identification information and the second identification information is predetermined;
      obtaining a first captured image by capturing the display surface on which the first pattern image is projected;
      projecting a second pattern image onto the display surface, the second pattern image including the first region having a third color which corresponds to a second portion of the first identification information which is different from the first portion and the second region having a fourth color corresponding to a second portion of the second identification information which is different from the first portion;
      obtaining a second captured image by capturing the display surface on which the second pattern image is projected;
      associating a first position in an image projected on the display surface with a second position in a third captured image that obtained by capturing the display surface on which the image is projected, based on the first color and the second color which are detected in the first captured image, and the third color and the fourth color which are detected in the second captured image.

6. A position detection system comprising:
   a display device;
   an imaging device;
   at least one processor which controls the display device and the imaging device, and configured to execute:
      projecting a first pattern image on a display surface, the first pattern image including a first region having a first color which corresponds to a first portion of a first identification information indicating the first region and a second region having a second color which corresponds to a first portion of a second identification information indicating the second region, an order of the first identification information and the second identification information is predetermined;
      obtaining a first captured image by capturing the display surface on which the first pattern image is projected;
      projecting a second pattern image onto the display surface, the second pattern image including the first region having a third color which corresponds to a second portion of the first identification information which is different from the first portion and the second region having a fourth color corresponding to a second portion of the second identification information which is different from the first portion;
      obtaining a second captured image by capturing the display surface on which the second pattern image is projected;
      associating a first position in an image projected on the display surface with a second position in a third captured image that obtained by capturing the display surface on which the image is projected, based on the first color and the second color which are detected in the first captured image, and the third color and the fourth color which are detected in the second captured image.

* * * * *